United States Patent [19]

Robertson, Jr.

[11] Patent Number: 4,958,930
[45] Date of Patent: Sep. 25, 1990

[54] APPARATUS FOR MONITORING THICKNESS VARIATIONS IN A FILM WEB

[75] Inventor: Charles W. Robertson, Jr., Centerville, Del.

[73] Assignee: E. I. du Pont de Nemours and Company, Wilmington, Del.

[21] Appl. No.: 807,517

[22] Filed: Dec. 11, 1985

[51] Int. Cl.⁵ .............................................. G01B 9/02
[52] U.S. Cl. ................................................... 356/357
[58] Field of Search .......................... 356/357; 73/655

[56] References Cited

U.S. PATENT DOCUMENTS

| 3,319,515 | 5/1967 | Flournoy | 88/14 |
| 3,354,311 | 11/1967 | Vali et al. | 73/655 X |
| 3,494,698 | 2/1970 | Neumann | 356/106 |
| 3,578,866 | 5/1971 | Kohler et al. | 356/74 |
| 3,639,063 | 2/1972 | Krogstad et al. | 356/106 |
| 3,720,471 | 3/1973 | Kasahara et al. | 356/108 |
| 4,254,337 | 3/1981 | Yasujima et al. | 356/357 X |
| 4,408,123 | 10/1983 | Sichling et al. | 250/226 |
| 4,548,502 | 10/1985 | Chandra et al. | 356/358 |

Primary Examiner—Davis L. Willis
Assistant Examiner—Matthew W. Koren

[57] ABSTRACT

An optical inspection apparatus using a polychromatic source to generate a channeled spectrum for measuring the variations in the thickness of a thin transparent web as the web moves on-line with respect to an optical inspection station.

7 Claims, 6 Drawing Sheets

APPARATUS FOR MONITORING THICKNESS VARIATIONS IN A FILM WEB

BACKGROUND OF THE INVENTION

1. Field of the Invention

The present invention relates to an optical web inspection apparatus and in particular to an optical web inspection apparatus able to monitor variations in thickness of a moving film web.

2. Description of the Prior Art

It is known in the art to utilize the interferometric effect created by the first and second surfaces of a traveling film web to generate an optical fringe pattern and to utilize the same in the determination of a predetermined physical property, typically the thickness in absolute terms, of the traveling web. Exemplary of such apparatus is that described in U.S. Pat. No. 3,319,515 (Flournoy) assigned to the assignee of the present invention. However, the system described in this patent does not provide a mechanism whereby small variations (in the range of less than one percent) in thickness of the traveling web can be accurately gauged while on-line, i.e., without removing the web from the manufacturing line.

Control systems which utilize interferometric phenomena are known. Exemplary of such systems are those shown in U.S. Pat. Nos. 3,494,698 (Neumann) and 3,963,063 (Krogstag et al.). These systems use monochromatic light These systems use monochromatic light sources and are, thus, not compatible for an inspection system in which on-line monitoring of a web may be effected because the film cannot itself be used as the interferometer.

Accordingly, in view of the foregoing it is believed advantageous to provide an apparatus for monitoring, on-line, thickness variations in a traveling web.

SUMMARY OF THE INVENTION

The present invention relates to an apparatus for monitoring, in an on-line environment, variations in thickness of a traveling web by using the shift of a predetermined interferometrically generated fringe as an indication of the magnitude of the variation of the film thickness from its initial thickness.

The shift of the fringe may be expressed as a displacement in wavenumber space or wavelength space.

In accordance With the present invention a polychromatic or white light source is directed at a predetermined portion of a traveling film web. The web serves as an interferometer to generate a channeled spectrum The spectrum is visualized by directing it toward a grating and then by a mirror onto a detector array such that a particular predetermined one of the fringes in the fringe pattern of the channeled spectrum is straddled by a pair of detectors. A shift of the selected fringe with respect to the detector array provides an electronically monitorable indicia for monitoring the displacement of the fringe thereby providing a measure as to variations in thickness of the web.

In the preferred embodiment, to improve the signal-to-noise ratio of the detected signal representative of fringe shift, the mirror is oscillated at a predetermined "dither" frequency. Electronic circuitry synchronously monitors the electrical signal output from each of the detectors and provides an electrical difference signal representative of the deflection in wavenumber space or wavelength space that the predetermined fringe undergoes as the web moves past the apparatus. The greater the deflection, the greater is the amplitude of the differential output. The amplitude and polarity of the differential signal provides an indication as to the magnitude and direction of the shift of the fringe. As a result a measurable indication of the variations in web thickness from an initial thickness may be obtained.

In addition, in the more preferred embodiment of the invention, to avoid the possibility that a large excursion in film thickness would drive the predetermined fringe beyond the span between the detectors, means are provided for tracking the selected fringe to insure that it is maintained between the detectors in the array.

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
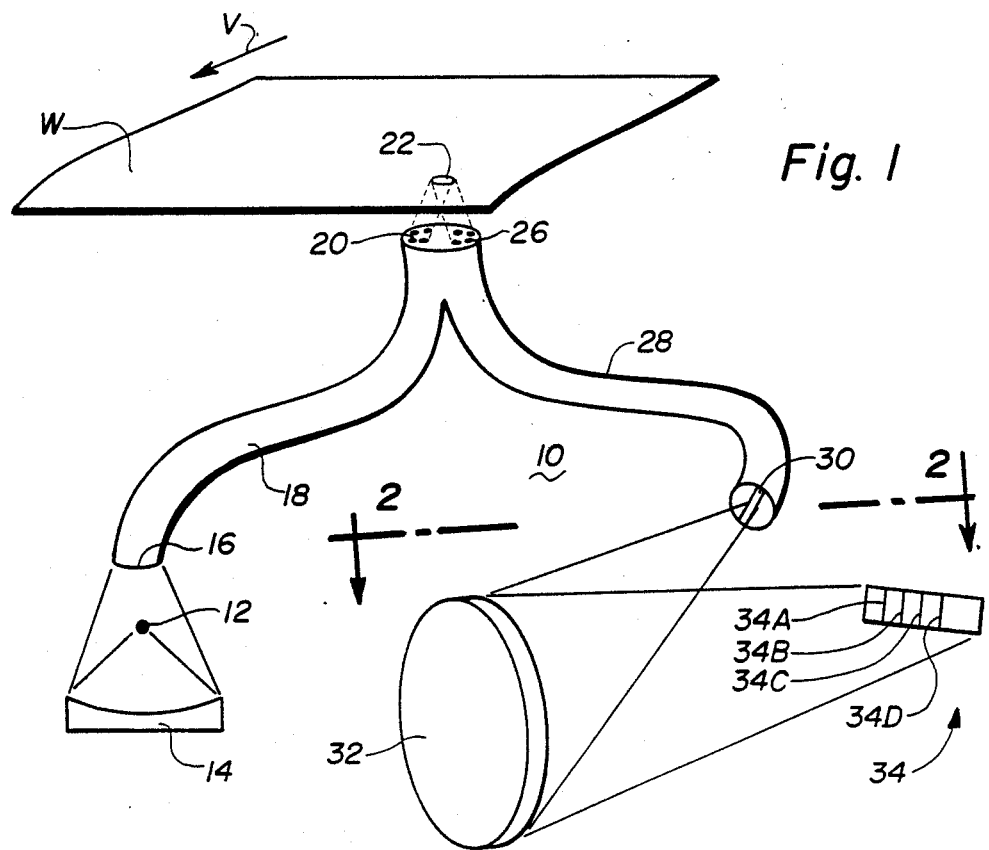
FIG. 1 is a highly stylized pictorial representation of the operating environment of the optical web inspection apparatus in accordance with the present invention.

Throughout the following detailed description similar reference numerals refer to similar elements in all figures of the drawings.

Figure 2:
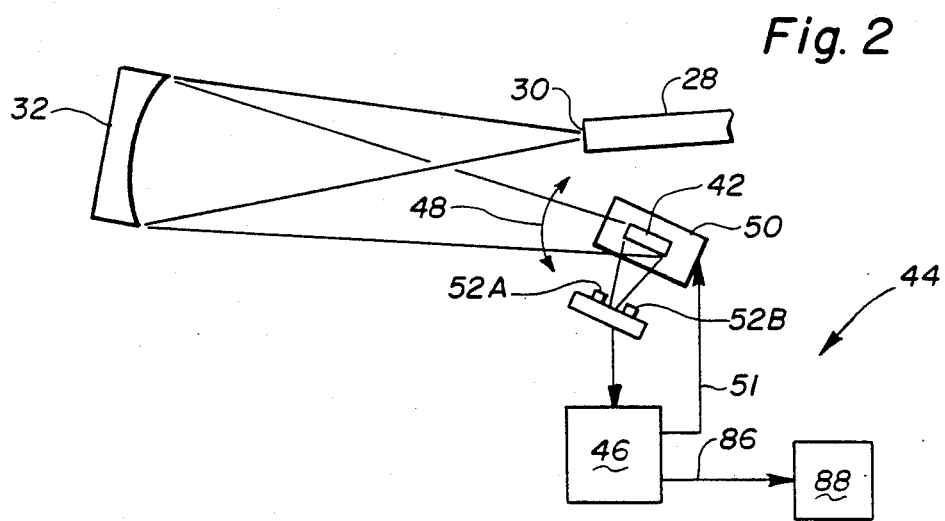
FIG. 2 is a plan view taken along view lines 2—2 in FIG. 1 showing a portion of the optical inspection apparatus in accordance with the present invention with additional elements being illustrated.

With reference to FIGS. 1 and 2 an optical thickness monitoring system generally indicated by reference character 10 in accordance with the present invention is shown in an operative position underneath a web W of thin transparent film material. The web W is typically on the order of 0.0005 to 0.001 inch in thickness. The web W is moved in the direction of the arrow V by a suitable drive system (not shown) past an inspection station at which the apparatus 10 is located. Any suitable web drive may be used. The system 10 may be suitably fixed with respect to the path of the web W or may itself scan across or with it, all within the contemplation of the present invention.

The apparatus 10 includes a polychromatic source diagrammatically illustrated at 12. A white light source such as an incandescent lamp may serve as the source 12. A concave focusing mirror or lens 14 directs radiation impinging thereon from the source 12 into the input ends 16 of a bundle 18 of optical fibers. The output ends 20 of the fiber bundle 18 are supported by any arrangement in proximity to the undersurface of the web W and serve to direct a spot 22 of interrogating radiation on a predetermined portion of the traveling web W as the same is moved past the monitoring system. The interferometric action of the opposed upper and lower surface boundaries of the web W generates an interference pattern in the manner indicated in U.S. Pat. No. 3,319,515 (Fluornoy) assigned to the assignee of the present invention. This patent is hereby incorporated by reference herein.

The pattern is reflected from the web W toward the input ends 26 of a second bundle 28 of optical fibers. The output end 30 of the second fiber bundle 28 is shaped identically to a detector 52A, 52B (to be discussed) and placed in operative adjacency to a concave holographic grating 32. A seventy millimeter concave holographic grating three hundred lines per inch, such as is available from Instruments SA, Metuchen, N.J. may be used as the grating 32. The grating is operative to produce a visualized channeled spectrum 34. The channeled spectrum is a series of interference fringes of which several dark fringes are indicated in FIG. 1 by the reference characters 34A, 34B, 34C and 34D. The fringes are physically manifested as a pattern of alternating bright and dark regions corresponding to the regions of constructive and destructive interference of the radiation reflected by the surfaces of the web W. The fringe pattern may also be graphically illustrated as a series of amplitude peaks and valleys as seen by reference to FIGS. 4A and 4B.

Figure 4A:
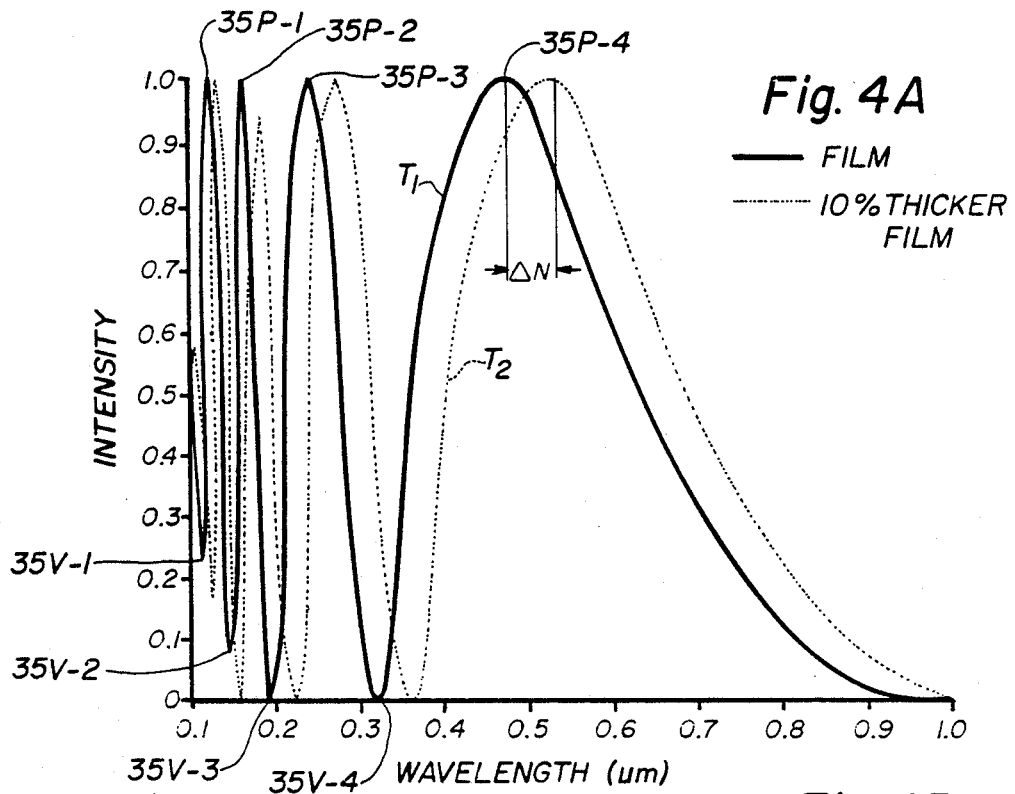
FIGS. 4A and 4B are graphic representations of the amplitude of a channeled spectrum produced by the apparatus of the present invention and the shift of the same in both wavelength and in wavenumber space respectively occasioned by a thickness variation in the web.
Figure 4B:
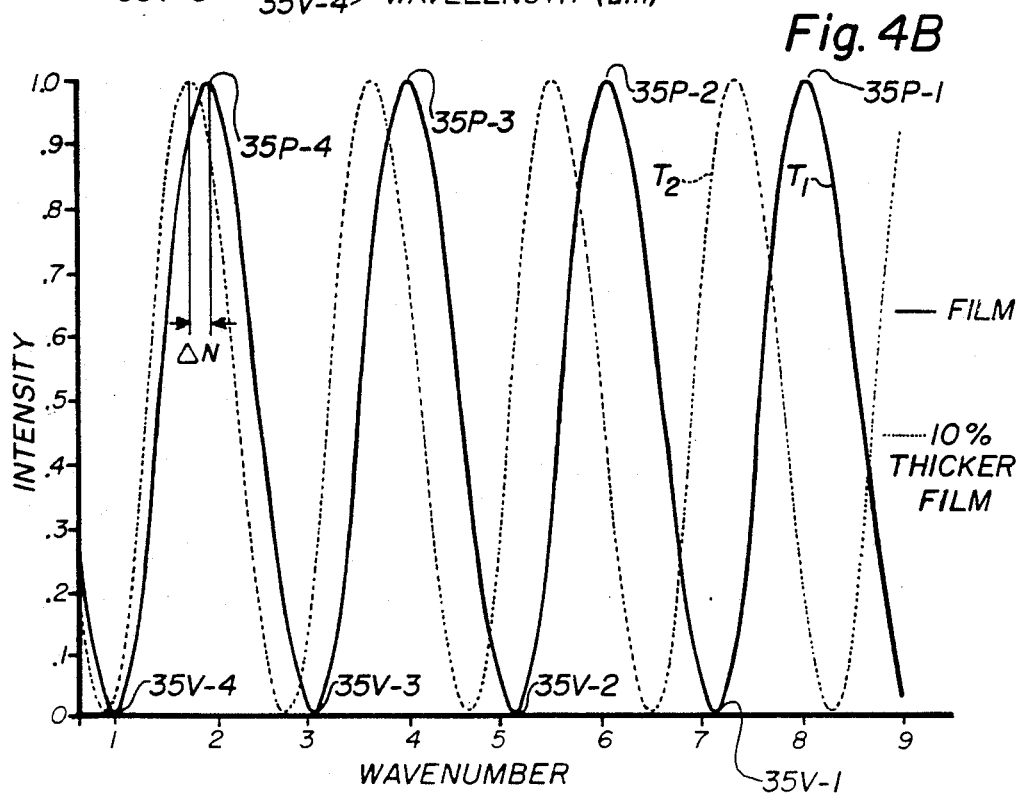

In FIG. 4A a portion of the channeled spectrum 34 for a web of a predetermined thickness $T_1$ is indicated in wavelength space by the solid line while the pattern produced by a Web of predetermined greater thickness $T_2$ (on the order of ten percent) is shown in dashed lines. FIG. 4B illustrates the same pattern as depicted in wavenumber space which linerizes the representation of the spectrum. Each pattern, in either wavelength space or wavenumber space, comprises a series of amplitude peaks 35P followed by an associated valley 35V. The valleys 35V-1 through 35V-4 correspond to the dark fringes 34A through 34D, respectively. The peaks 35P correspond to bright fringes (not conveniently able to be illustrated) of the spectrum 34. It is to be noted that the effect of a thickness variation in a web results in a shift or displacement of the location of corresponding peak (or valley) in both wavelength and wavenumber space. The shift of a given peak, e.g., the peak, 35P-4, is indicated by the symbol $\Delta N$. The observation of this Phenomena, viz., that the magnitude and direction of the shift of a fringe provides an indication of the variation in thickness from an initial thickness, and serves as the basis for the present invention, as is discussed herein. In this manner variations in thickness of less than one percent of an initial thickness may be monitored.

The spectrum 34 is reflected by a mirror 42 toward fringe monitoring means generally indicated by reference character 44. The means 44 may be suitably configured in any manner so as to provide an indication of the displacement of the given fringe and it is to be understood that any such arrangement for so doing is to be construed as lying within the contemplation of this invention. The means 44 includes a control electronics network 46 to b Ⓡdescribed more fully herein.

To enhance the signal-to-noise ratio of the signal output representative of the displacement of the fringe, the mirror 42 is mounted for oscillatory movement in the direction of arrows 48 on a suitable platform 50. The platform 50 is driven in the oscillatory directions 48 by a conventional galvanometer drive such as that sold by General Scanning, Inc. under Model Number G100PD (galvanometer) with a drive sold under Model Number A610. Equivalents of these components are available from the same source as Model Numbers G120D and A6120K respectively. The drive is controlled by an output applied from the control network 46 on a line 51. Accordingly the mirror 42 is oscillated or "dithered" at a predetermined frequency. In the embodiment shown in FIG. 2 the dither frequency is two hundred Hertz while in the embodiment of FIG. 5 the dither frequency is six kiloHertz.

Figure 3A:
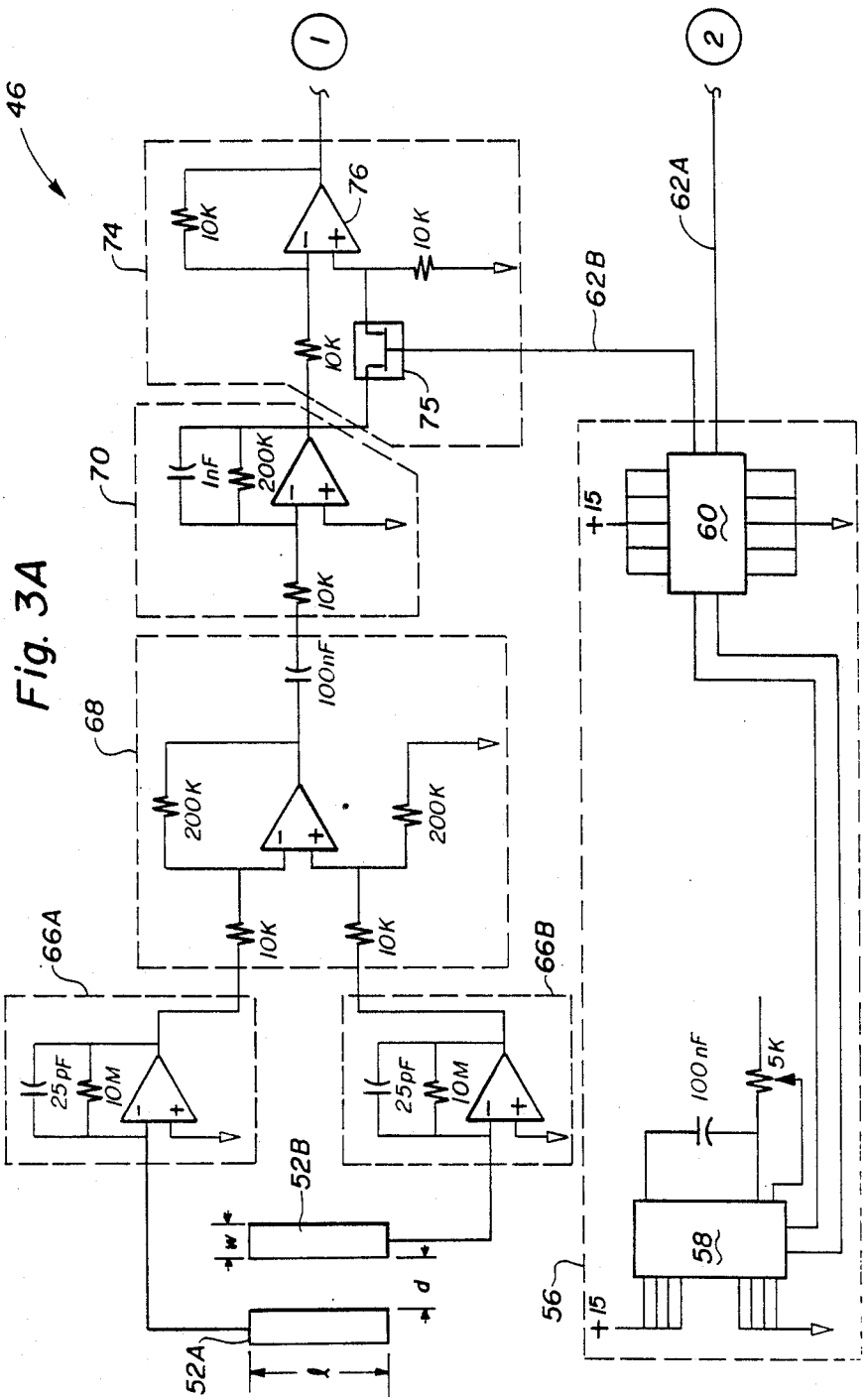
FIGS. 3A and 3B combine to illustrate a detailed schematic diagram of the control electronics used in connection with the inspection apparatus of the present invention.
Figure 3B:
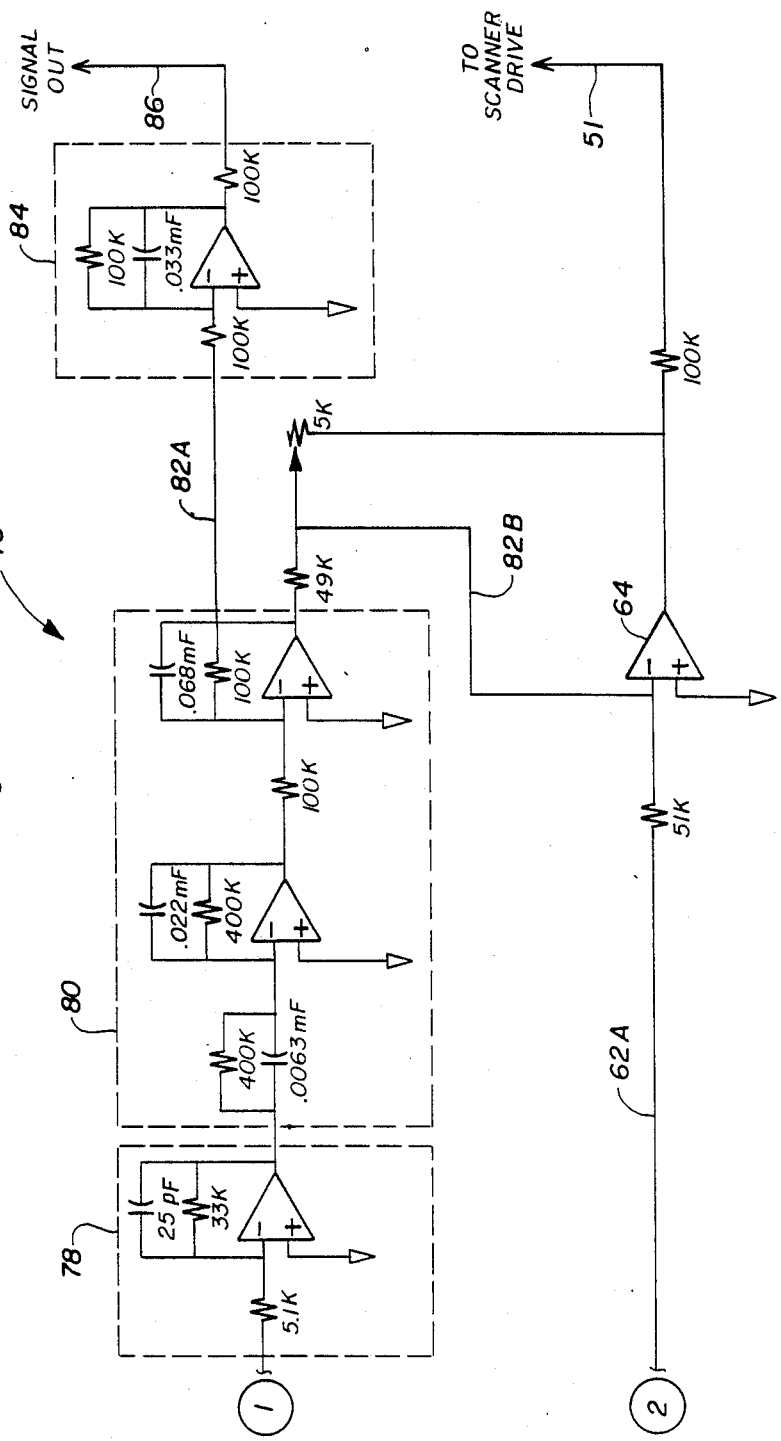

As is best seen in FIGS. 3A and 3B in the preferred embodiment the detector used in the means 44 is configured from a pair of silicon photodetectors 52A and 52B such as those manufactured and sold by Silicon Detector Corporation. The detectors 52A, 52B preferably operate in the near infrared range, i.e., approximately 750–850 nanometers. Each of the detectors 52A, 52B are configured to define predetermined physical dimension of length "1", width "w" and spacing "d". These physical dimensions should be such as to permit the detectors 52A, 52B to encompass a given fringe over at most approximately one-half of its extent in wavelength or wavenumber space. More preferably the detectors encompass approximately one-third of the fringe. To this end, in the case of monitoring the thickness of a web on the order of 0.0005 inches the length "1" of each detector 52 is 4.5 mm, the width "w" is 0.23 mm., and the spacing 0.02 mm. These dimensions are, of course, exaggerated in the Figure. A pair of detectors 52A, 52B is preferred since their use eliminates variations in reflected light from the film due, for example, to flutter and from the effects of fluorescent lights or other extraneous signal sources in the operating environment.

As a result of the oscillation of the platform 50 a given one of the fringes in the fringe pattern is played back and forth past the detectors 52A, 52B. The oscillation of the mirror 42 is controlled by a dither control network 56 which is configured from an oscillator 58 and a corresponding divide-by-two counter 60. Suitable for use as these components are devices manufactured and sold by RCA under Model Numbers CD4047 and CD4027BE, respectively. One output of the dither generator 56 is applied over a line 62A to a driver amplifier 64 (FIG. 3B) configured from a device sold by Texas Instruments under Model Number TL074. The output of the amplifier 64 is applied to drive the platform 50 over the line 51 The other output of the counter 60 is carried over a line 62B.

Each of the photodetectors 52A and 52B is connected through a respective preamplifier stage 66A and 66B to a differential amplifier network 68 configured from a device similar to that used for the amplifier 64. The output of the differential amplifier 68 is inverted and amplified by a stage 70 and applied to the input of a synchronous rectifier network 74 similar to that shown in U.S. Pat. No. 3,955,096 (Faulhaber), assigned to the assignee of the present invention. The network 74 includes an FET switch 75 and an amplifier 76. At the synchronous rectifier 74 the signal from the differential amplifier 68 is rectified to provide a higher signal-to-noise ratio. The gain of the network 74 is switched between +1 and −1 at the dither rate by the action of the FET switch 75 which is gated in accordance with an output of the counter 60 as applied over the line 62B. The signal on the line 62A is ninety degrees out of phase from the signal on the line 62B. An additional ninety degree phase shift is introduced by the mechanics of the particular drive 50 used in the embodiment shown. It should be understood that however it is provided there should be either a zero or one hundred eighty degree phase difference between the signal on the line 62B and the signal at the output of the amplifier 70.

The full wave rectified output of the rectifier 74 is low pass filtered by a filter network 78 and, after further filtering by a multistage filter network 80 the signal representative of the shift of the given fringe and therefore the magnitude of the thickness variation of the web W, is applied on a line 82A to an appropriate buffering network 84. The analog signal output from the buffer 84 is applied over a line 86 to any suitable output monitoring device 88 (FIGS. 2 and 5) which provides a measured indication as are the variation in web thickness from an initial web thickness. This information may for example, be used to monitor the process parameters by which the web W is formed.

In operation a selected one of the fringes in the fringe pattern 34 (e.g., a predetermined bright or dark fringe) is appropriately positioned in the span between the detectors 52A. 52B. The relative position of the maximum of the selected fringe with respect to the detectors 52A, 52B results in a correspondingly greater and lesser current being produced by the detector that is closer to that fringe than that by the detector that is farther from the fringe. An analogous result would be obtained were a dark fringe selected As a result, as variations in the thickness of the web occur, the particular fringe that is bracketed by the detectors shifts in wavelength space (FIG. 4A) or in wavenumber space (FIG. 4B). The means 44 responds to this shift such that the respective outputs from the detectors will be correspondingly greater and lesser voltages. These signals when differentially amplified produce a signal the amplitude and polarity of which provide an indication as to the magnitude and direction of the shift of the predetermined fringe As a result a precise measurable indication of the relative variation in the thickness of the web relative to an initial thickness may be obtained as the web passes the monitoring position.

To avoid the possibility that a large excursion in film thickness will drive a selected fringe out of the span of the detectors 52A, 52B the selected fringe is tracked as it is shifted in wavelength space or wavenumber space. In the embodiment shown in FIGS. 3A and 3B the tracking of the fringe is accomplished by applying the signal representative of the thickness variation (i.e., the signal representative of the displacement of the fringe) from the filter 80 on a line 82B as an input to the amplifier 64 which controls the movement of the scanner drive. The tracking means is able to track large excursions occurring at rates of up to fifty Hertz.

Figure 5:
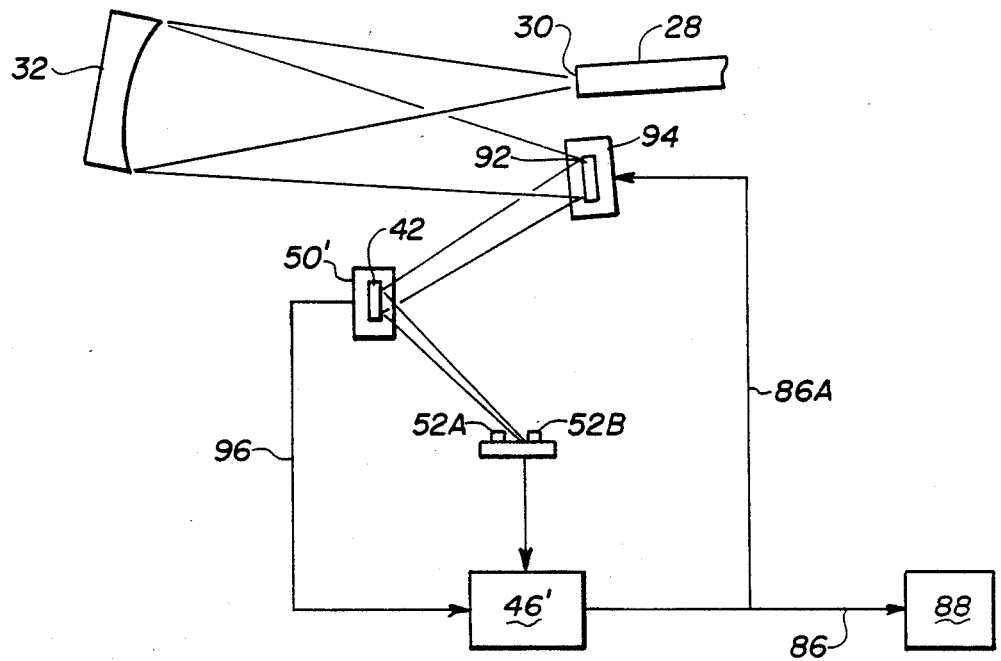
FIG. 5 is a stylized pictorial representation of a portion of the web inspection system in which the fringe monitoring and fringe tracking functions are performed by separate mirrors.
Figure 6:
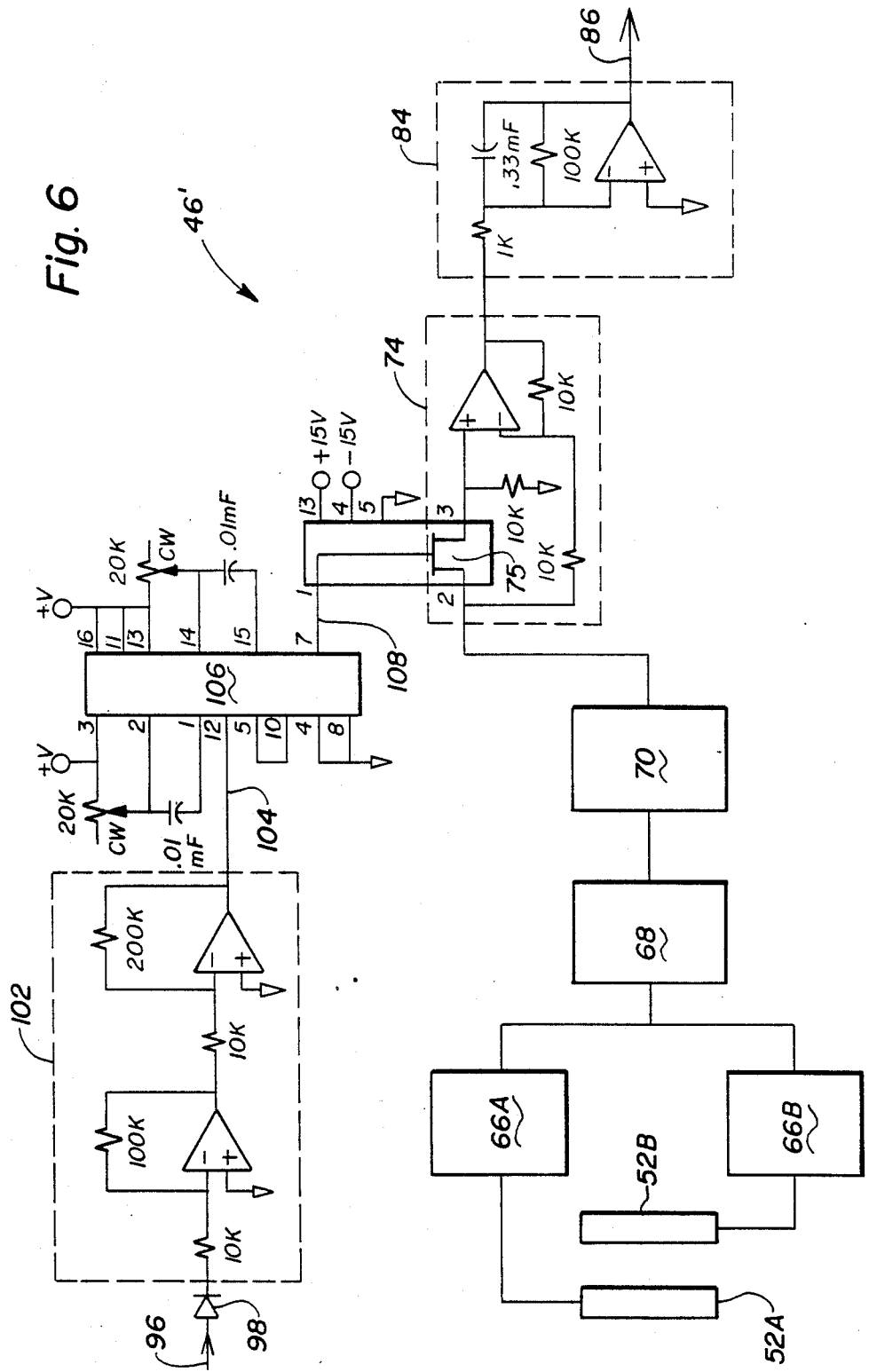
FIG. 6 is a detailed schematic diagram of a circuit useful with the embodiment of FIG. 5.

The dither and tracking functions can be separated using the embodiment of the invention shown in FIGS. 5 and 6 In this embodiment a separate tracking mirror 92 is mounted on a drive 94. The mirror 92 directs the channeled spectrum onto the mirror 42 which in this instance is driven at a predetermined dither frequency by a drive 50'. A signal representative of the position of the dither mirror 42 is applied over a line 96 to a modified control network 46' shown in FIG. 6.

The signal from the dither drive on the line 96 is rectified by a rectifier 98 and amplified by a two-stage amplifier network 102 to form a square wave output on a line 104. A dual one-shot 106 such as that manufactured by RCA and sold as model number CD4098 produces a phase offset square wave. This signal is applied over a line 108 to the gate of the switch 75. The signal output from the synchronous rectifier 74 is buffered by the amplifier 84 and applied over the line 86 to the output device 88. The signal on the line 86 is also applied to the drive 94 of the tracking mirror over a line 86A. The elements 66A, 66B, 68 and 70 shown in FIG. 6 are functionally identical to those corresponding elements shown in FIG. 3A. It should be noted that the symbol "mF" seen in FIGS. 3B and 6 represents the quantity "microFarad".

Those skilled in the art having the benefit of the teachings of the present invention as hereinabove set forth may effect numerous modifications thereto. For example, a single detector having an effective surface area at most equal to $(2w+d)\cdot 1$ instead of a detector pair, along with appropriate modification to the electronics network, may be utilized. These modifications are, however, to be construed as lying within the scope of the present invention as defined by the appended claims.

What is claimed is:

1. An inspection apparatus for monitoring, on-line, variations in thickness of a traveling web comprising:
   a polychromatic radiation source;
   means for directing radiation from the source onto a predetermined portion of the web as the same moves with respect to the source to generate an interference fringe pattern by the interferometric action of the surfaces of the web; and
   means for monitoring a predetermined one of fringes in the pattern and for generating an electrical signal the amplitude and polarity of which are functionally related to the magnitude and direction, respectively, of the displacement of the fringe thereby to provide an indication as to corresponding variations in web thickness.

2. The apparatus of claim 1 further comprising:
   means for tracking the predetermined fringe.

3. The apparatus of claim 1 wherein the monitoring means comprises a spaced pair of photodetectors arranged to bracket the predetermined fringe.

4. The apparatus of claim 1 further comprising:
   means for generating relative oscillatory motion between the selected fringe and the monitoring means.

5. The apparatus of claim 2 further comprising:
   means for generating relative oscillatory motion between the selected fringe and the monitoring means 6. The apparatus of claim 3 further comprising:
   means for generating relative oscillatory motion between the selected fringe and the pair of photodetectors.

7. The apparatus of claim 2 wherein the tracking means is responsive to the signal representative of the displacement of the fringe.

* * * * *